(12) United States Patent
Mitsuyasu et al.

(10) Patent No.: US 10,957,457 B2
(45) Date of Patent: Mar. 23, 2021

(54) MOX FUEL ASSEMBLY

(71) Applicant: Hitachi, Ltd., Tokyo (JP)

(72) Inventors: Takeshi Mitsuyasu, Tokyo (JP); Motoo Aoyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 203 days.

(21) Appl. No.: 16/078,937

(22) PCT Filed: Feb. 23, 2016

(86) PCT No.: PCT/JP2016/055280
§ 371 (c)(1),
(2) Date: Aug. 22, 2018

(87) PCT Pub. No.: WO2017/145268
PCT Pub. Date: Aug. 31, 2017

(65) Prior Publication Data
US 2019/0051421 A1  Feb. 14, 2019

(51) Int. Cl.
*G21C 3/328* (2006.01)
*G21C 7/04* (2006.01)
(Continued)

(52) U.S. Cl.
CPC ............. *G21C 3/328* (2013.01); *G21C 3/326* (2013.01); *G21C 3/3225* (2019.01); *G21C 7/04* (2013.01);
(Continued)

(58) Field of Classification Search
CPC ........ G21C 3/328; G21C 3/322; G21C 3/326; G21C 3/62; G21C 3/623; G21C 7/04
(Continued)

(56) References Cited

U.S. PATENT DOCUMENTS

2009/0252282 A1  10/2009  Mitsuyasu et al.

FOREIGN PATENT DOCUMENTS

EP  2 088 600 A1  8/2009
JP  59-46587 A  3/1984
(Continued)

OTHER PUBLICATIONS

Extended European Search Report issued in counterpart European Application No. 16891426.5 dated Sep. 4, 2019 (eight (8) pages).
(Continued)

*Primary Examiner* — Jack W Keith
*Assistant Examiner* — Daniel Wasil
(74) *Attorney, Agent, or Firm* — Crowell & Moring LLP

(57) ABSTRACT

A fuel assembly, which linearizes change of an infinite multiplication factor of a fuel and flattens excess reactivity while increasing average fissile plutonium enrichment of a MOX fuel, and a reactor are provided. The fuel assembly includes first fuel rods containing Pu and not containing burnable poison, a second fuel rod containing uranium and burnable poison and not containing Pu, a water rod, and a channel box accommodating the first and second fuel rods and the water rod in a bundle. The second fuel rod is disposed on an outermost periphery and/or adjacent to the water rod, of a fuel rod array in a horizontal section, and N2<N1 (N2 is a positive integer or zero) is satisfied where the number of second fuel rods arranged on the outermost periphery is N1 and the number of second fuel rods arranged adjacent to the water rod is N2.

12 Claims, 10 Drawing Sheets

(51) Int. Cl.
*G21C 3/326* (2006.01)
*G21C 3/322* (2006.01)
*G21C 3/62* (2006.01)
*G21C 1/08* (2006.01)

(52) U.S. Cl.
CPC ............. *G21C 1/084* (2013.01); *G21C 3/322* (2013.01); *G21C 3/62* (2013.01); *G21C 3/623* (2013.01); *Y02E 30/30* (2013.01)

(58) Field of Classification Search
USPC .................................................. 376/419, 435
See application file for complete search history.

(56) References Cited

FOREIGN PATENT DOCUMENTS

| | | |
|---|---|---|
| JP | 5-8398 B2 | 2/1993 |
| JP | 2000-9870 A | 1/2000 |
| JP | 2000111679 A * | 4/2000 ............. G21C 3/328 |
| JP | 2000-180574 A | 6/2000 |
| JP | 2002-181973 A | 6/2002 |
| JP | 2002-189095 A | 7/2002 |
| JP | 4046870 B2 | 2/2008 |
| JP | 2010-237223 A | 10/2010 |

OTHER PUBLICATIONS

International Search Report (PCT/ISA/210) issued in PCT Application No. PCT/JP2016/055280 dated Apr. 12, 2016 with English translation (four (4) pages).

Japanese-language Written Opinion (PCT/ISA/237) issued in PCT Application No. PCT/JP2016/055280 dated Apr. 12, 2016 (three (3) pages).

* cited by examiner

MOX FUEL ASSEMBLY

TECHNICAL FIELD

The present invention relates to a fuel assembly and a reactor loaded with the fuel assembly, and more particularly to a fuel assembly suitable for application to a boiling water reactor, and a reactor loaded with the fuel assembly.

BACKGROUND ART

A plurality of fuel assemblies is loaded in a reactor of a boiling water reactor. The fuel assembly includes a plurality of fuel rods enclosing a plurality of fuel pellets including a nuclear fuel material (for example, uranium oxide), an upper tie plate that supports upper end portions of the fuel rods, a lower tie plate that supports lower end portions of the fuel rods, a plurality of fuel spacers that holds spacing between the fuel rods, and a square tubular channel box. The channel box has an upper end portion attached to the upper tie plate and extends toward the lower tie plate, and surrounds the plurality of fuel rods bundled by the plurality of fuel spacers.

A plurality of control rods is inserted in the reactor to control reactor power. Further, some of the fuel rods in the fuel assembly contain burnable poison (for example, gadolinium: Gd) in the fuel pellets. The control rod and the burnable poison absorb extra neutrons generated by nuclear fission of the nuclear fuel material. The burnable poison turns into a substance that hardly absorbs neutrons due to absorption of neutrons. Therefore, the burnable poison contained in a new fuel assembly (a fuel assembly with the burnup of 0 GWd/t) loaded in the reactor disappears when a certain operation period of the nuclear reactor has passed since the new fuel assembly was loaded in the reactor. In the fuel assembly from which the burnable poison has disappeared, the reactivity is monotonously decreased as the nuclear fuel material is burned. Since a plurality of fuel assemblies having different operating cycle numbers staying in the reactor is loaded in the reactor, the critical state is maintained throughout the operation period of the whole reactor.

A fuel assembly fabricated using a material as a fuel such as plutonium (Pu) obtained by reprocessing a uranium fuel taken out of the nuclear reactor is called a MOX fuel. Burnable poison is loaded even in the MOX fuel. However, since the average energy of neutrons becomes high in the reactor using the MOX fuel (the neutron energy spectrum becomes hard), the neutron absorption effect of the burnable poison becomes small.

Further, since plutonium is taken out by reprocessing, a concentration process to increase the plutonium enrichment is unnecessary, unlike the uranium fuel. That is, since the increase in the enrichment of the MOX fuel is possible at a relatively low cost, an increase in the burnup by the MOX fuel with high enrichment is effective for cost reduction. However, the amount of loading of plutonium is decreased if the burnable poison is added to and loaded in the uranium fuel rod, which hinders the increase in the enrichment. In the case of loading fissile plutonium to flatten the power distribution in the fuel assembly, the enrichment of the outermost periphery of the fuel assembly is decreased, similarly to uranium. That is, the disadvantage of the decrease in the enrichment can be minimized by loading the fuel rod to which the burnable poison is added on the outermost periphery. Here, the concentration of the burnable poison needs to be increased when considering a long-term cycle operation, in addition to the increase in the burnup. The burnable poison can be maintained without being burned out for a long period of time by loading the fuel rod at a position with hard neutron spectrum except the outermost periphery portion. However, it is favorable to arrange the fuel rod on the outermost periphery for the above reason. However, since the neutron moderation effect is large on the outermost periphery and the neutron energy spectrum becomes soft, the burnable poison is burned out at an early stage. The addition amount of the burnable poison has an upper limit due to problems such as fuel manufacturability and a decrease in thermal conductivity at loading.

Therefore, for example, the technology described in PTL 1 has been proposed. PTL 1 discloses a configuration in which fuel rods containing natural uranium and gadolinium (Gd) and not containing plutonium (hereinafter referred to as gadolinium fuel rods) are arranged at four corners on an outermost periphery in a horizontal section of a fuel assembly, and two gadolinium fuel rods are arranged vertically and horizontally adjacent to the gadolinium fuel rod at one corner. A configuration to arrange a plutonium high enriched fuel rod, a plutonium low enriched fuel rod, and a plutonium lowest enriched fuel rod is described in addition to the above configuration. Since gadolinium as burnable poison has large absorption of neutrons, a neutron flux around gadolinium is small. When the gadolinium fuel rod is arranged there, neutrons reacting with gadolinium apparently become small and the burnable poison can be maintained for a long period of time without burning out the burnable poison.

PTL 2 discloses a configuration in which gadolinium-containing uranium fuel rods (hereinafter referred to as gadolinium fuel rods) are arranged at four corner positions on an outermost periphery in a horizontal section of a fuel assembly, and two gadolinium fuel rods are arranged at positions vertically and horizontally adjacent to two corner positions except a corner position on a control rod side and a corner position diagonally located across the corner position on a control rod side.

CITATION LIST

Patent Literature

PTL 1: JP 05-008398 B
PTL 2: JP 2000-180574 A

SUMMARY OF INVENTION

Technical Problem

PTL 1 discloses the configuration in which the two gadolinium fuel rods are arranged vertically and horizontally adjacent to the gadolinium fuel rod at one corner in the horizontal section of the fuel assembly, and the gadolinium fuel rods arranged at the other three corners do not have adjacent gadolinium fuel rods. Here, in the two gadolinium fuel rods arranged vertically and horizontally adjacent to the gadolinium fuel rod at one corner, an effect to decrease the infinite multiplication factor is reduced due to suppression of the neutron absorption effect (neutron shielding) at the initial stage of burnup. On the other hand, the gadolinium fuel rods arranged at the other three corners decrease the infinite multiplication factor at the initial stage of burnup without suppression of the neutron absorption effect. However, in the configuration of PTL 1, the number of the gadolinium fuel rods arranged at the three corners without being adjacent to one another is three, and the number of the gadolinium fuel rods adjacent to only one gadolinium fuel rod (the gadolinium fuel rod at one corner) is two. The infinite multiplication factor is excessively decreased at the initial stage of burnup, and flattening of the excess reactivity is impaired.

Further, PTL 2 discloses the configuration in which two gadolinium fuel rods are arranged vertically and horizontally adjacent to the gadolinium fuel rods arranged at the two corner positions except the corner position on a control rod side and the corner position diagonally located across the corner position on a control rod side, and one gadolinium fuel rod is arranged at the other two corner positions. Therefore, the number of the gadolinium fuel rods arranged at the corner positions without being adjacent to each other is two whereas the number of the gadolinium fuel rods adjacent to only one gadolinium fuel rod (the gadolinium fuel rods arranged at two corner positions except the corner position on a control rod side and the corner position diagonally located across the corner position on a control rod side) is four (the number of the gadolinium fuel rods adjacent to two gadolinium fuel rods is two). The excessive decrease in the infinite multiplication factor at the initial stage of burnup like PTL 1 can be prevented. However, the gadolinium fuel rods adjacent to the two gadolinium fuel rods of PTL 2 impede the flattening of the excess reactivity due to a large shielding effect, and the number is the same as the number of the gadolinium fuel rods for flattening the excess reactivity (two), and thus the flattening is impaired.

Therefore, the present invention provides a fuel assembly capable of linearizing change of the infinite multiplication factor of the fuel and flattening the excess reactivity while increasing average fissile plutonium enrichment of the MOX fuel, and a reactor loaded with the fuel assembly.

Solution to Problem

To solve the above problem, a fuel assembly of the present invention includes at least, a first fuel rod containing plutonium and not containing burnable poison, a second fuel rod containing uranium and burnable poison and not containing plutonium, a water rod, and a channel box having a rectangular shape in horizontal section and accommodating the first fuel rod, the second fuel rod, and the water rod in a bundle, wherein the second fuel rod is disposed on an outermost periphery and/or adjacent to the water rod, of a fuel rod array in the horizontal section, N2<N1 (N2 is a positive integer including zero) is satisfied where the number of the second fuel rods arranged on the outermost periphery is N1 and the number of the second fuel rods arranged adjacent to the water rod is N2, and W2<N2+W0<W1 (W2 is a positive integer including zero) is satisfied where the number of the second fuel rods arranged without being vertically and/or horizontally adjacent to each other in the horizontal section is W0, the number of the second fuel rods arranged vertically and/or horizontally adjacent to only one second fuel rod in the horizontal section is W1, and the number of the second fuel rods arranged vertically and/or horizontally adjacent to two second fuel rods in the horizontal section is W2, of the second fuel rods arranged on the outermost periphery.

Further, a reactor of the present invention is a reactor of a nuclear reactor loaded with a plurality of fuel assemblies, the fuel assembly including at least, a first fuel rod containing plutonium and not containing burnable poison, a second fuel rod containing uranium and burnable poison and not containing plutonium, a water rod, and a channel box having a rectangular shape in horizontal section and accommodating the first fuel rod, the second fuel rod, and the water rod in a bundle, wherein the second fuel rod is disposed on an outermost periphery and/or adjacent to the water rod, of a fuel rod array in the horizontal section, N2<N1 (N2 is a positive integer including zero) is satisfied where the number of the second fuel rods arranged on the outermost periphery is N1 and the number of the second fuel rods arranged adjacent to the water rod is N2, and W2<N2+W0<W1 (W2 is a positive integer including zero) is satisfied where the number of the second fuel rods arranged without being vertically and/or horizontally adjacent to each other in the horizontal section is W0, the number of the second fuel rods arranged vertically and/or horizontally adjacent to only one second fuel rod in the horizontal section is W1, and the number of the second fuel rods arranged vertically and/or horizontally adjacent to two second fuel rods in the horizontal section is W2, of the second fuel rods arranged on the outermost periphery.

Advantageous Effects of Invention

According to the present invention, a fuel assembly capable of linearizing change of an infinite multiplication factor of a fuel and flattening excess reactivity while increasing average fissile plutonium enrichment of a MOX fuel, and a reactor loaded with the fuel assembly can be provided.

Problems, configurations, and effects other than those described above will be clarified from description of the following embodiments.

DESCRIPTION OF EMBODIMENTS

The present inventors and the like have repeated various examinations and have found a new configuration that increases plutonium enrichment and prolongs an operation cycle in a MOX fuel. The examination result and the outline of the newly found MOX fuel configuration will be described below.

Figure 7:
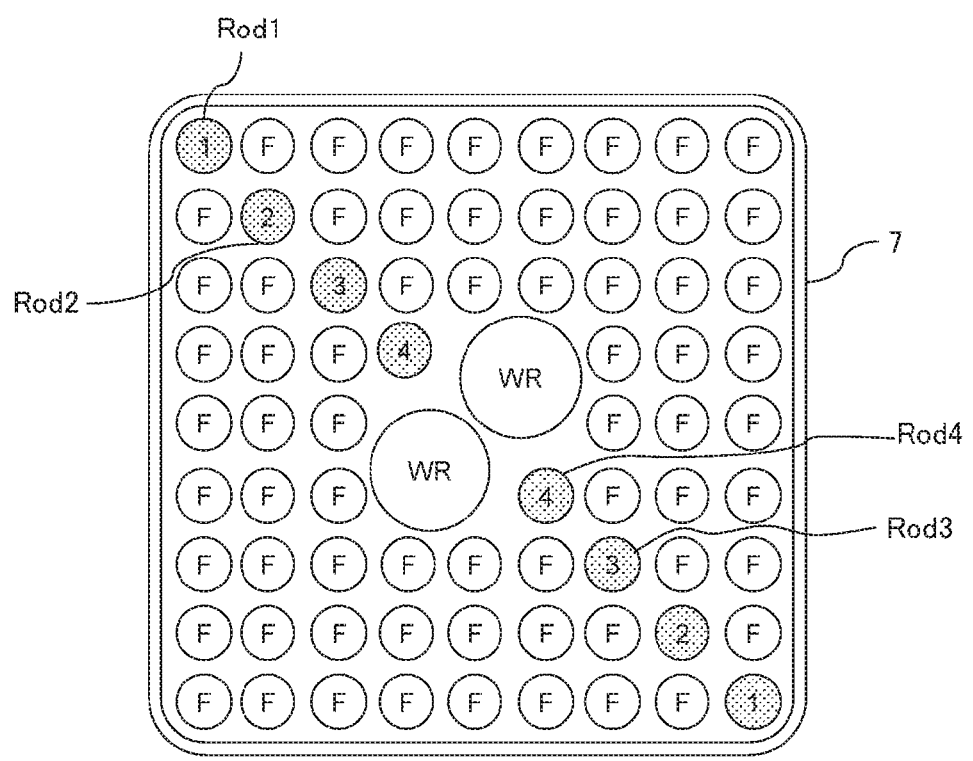
FIG. 7 is a horizontal sectional view of a fuel assembly used for verification of an effect of burnable poison.

As in the prior technologies, to increase the plutonium enrichment of the MOX fuel of a boiling water reactor (BWR), the number of burnable poison-added fuel rods needs to be decreased as many as possible. Furthermore, to prolong the operation cycle, the concentration of the burnable poison needs to be increased. Gadolinium (Gd), which is used as burnable poison, is generally used with the concentration of 10 wt % as an upper limit. This upper limit is set due to the problem of fuel manufacturability and thermal conductivity. To decrease the number of fuel rods to which burnable poison is added, the fuel rods are arranged at positions where the neutron absorption effect is large. Therefore, the present inventors and the like have examined neutron absorption characteristics with respect to a position of burnable poison, using the verification system illustrated in FIG. 7. FIG. 7 is a horizontal sectional view of a fuel assembly used for verification of an effect of burnable poison. The fuel assembly illustrated in FIG. 7 includes fuel rods F having uniform fissile plutonium enrichment except burnable poison-added fuel rods, and burnable poison-added fuel rods Rod 1 to Rod 4 in which the nuclear fuel material of the burnable poison-added fuel rod is configured only by natural uranium and to which 10 wt % of gadolinium is added as the burnable poison. The burnable poison-added fuel rod Rod 1 is disposed on an outermost periphery, and the burnable poison-added fuel rod Rod 4 is disposed adjacent to a water rod WR. Further, the burnable poison-added fuel rod Rod 2 is disposed on a layer that is one layer inner than the burnable poison-added fuel rod Rod 1 arranged on the outermost periphery, and the burnable poison-added fuel rod Rod 3 is disposed on a layer that is one layer inner than the burnable poison-added fuel rod Rod 2.

Figure 8:
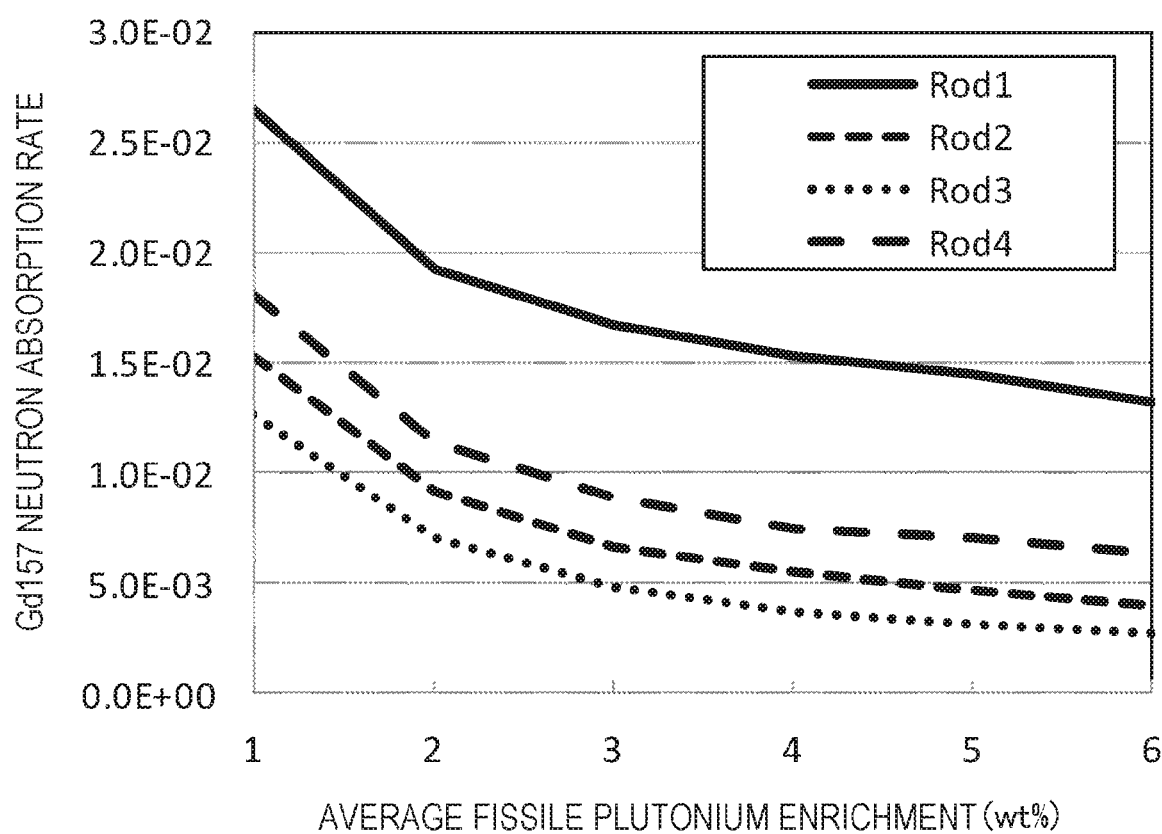
FIG. 8 is a diagram illustrating a relationship of a neutron absorption rate of Gd157 with respect to average fissile plutonium enrichment in a verification system.

FIG. 8 is a diagram illustrating a relationship of a neutron absorption rate of Gd157 with respect to an average fissile plutonium enrichment in the verification system illustrated in FIG. 7. In FIG. 8, the horizontal axis represents average fissile plutonium enrichment (wt %) and the vertical axis represent a neutron absorption rate of Gd157, and change of the respective neutron absorption rates of Gd 157 of the burnable poison-added fuel rods Rod 1 to Rod 4 are illustrated. Here, Gd 157 is a nuclide that is easy to react among gadolinium nuclides. As illustrated in FIG. 8, in the horizontal section of the fuel rod, the neutron absorption rate of the burnable poison-added fuel rod Rod 1 is highest, and the neutron absorption rate is decreased with the increase in the fissile plutonium enrichment.

Figure 9:
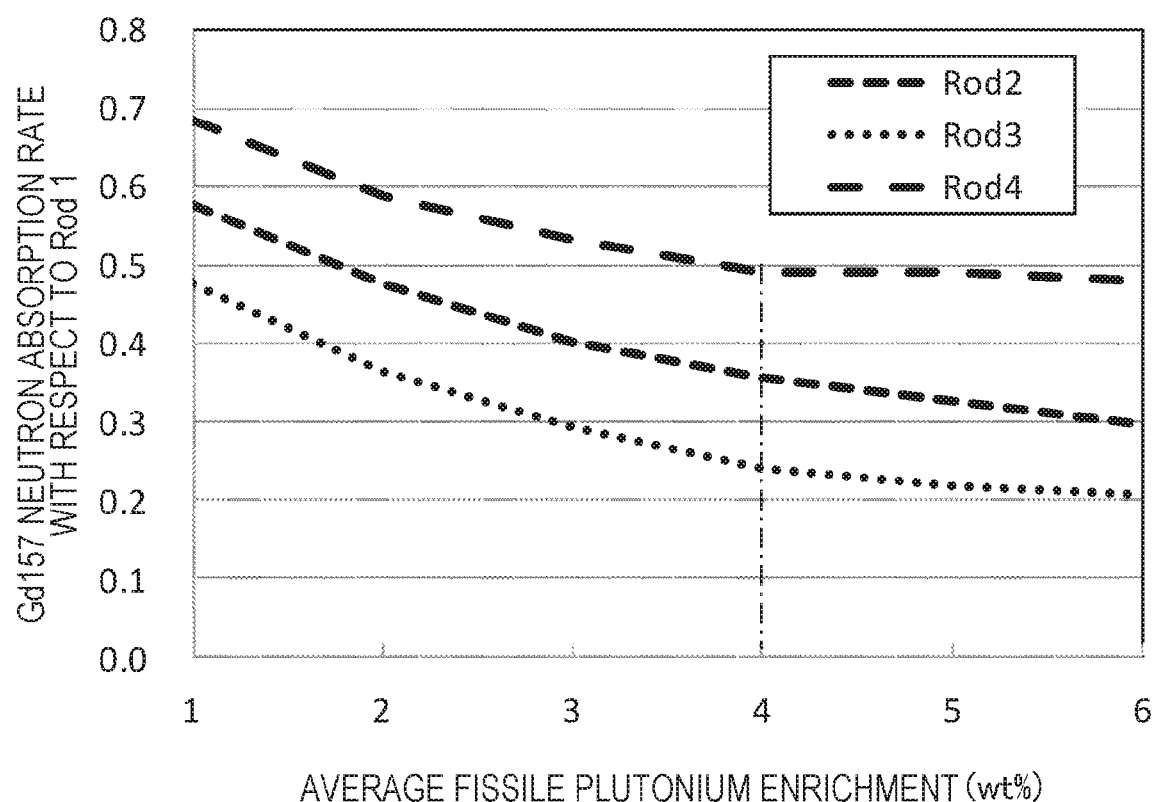
FIG. 9 is a diagram illustrating a relationship of a neutron absorption rate of Gd157 with respect to an average fissile plutonium enrichment in a verification system and Rod 1.

FIG. 9 illustrates a relationship between the average fissile plutonium enrichment in the verification system illustrated in FIG. 7 and the neutron absorption rate of Gd157 with respect to the burnable poison-added fuel rod Rod 1. In FIG. 9, the horizontal axis represents the average fissile plutonium enrichment (wt %) and the vertical axis represents the neutron absorption rate of Gd157 with respect to the burnable poison-added fuel rod Rod 1, and change of the neutron absorption rates of the burnable poison-added fuel rods Rod 2, Rod 3, and Rod 4 with respect to the neutron absorption rate of the burnable poison-added fuel rod Rod 1 are illustrated. While the difference from the neutron absorption rate of the burnable poison-added fuel rod Rod 1 is increased with the increase in the fissile plutonium enrichment, the difference of the burnable poison-added fuel rod Rod 4 nearly becomes constant at the fissile plutonium enrichment of 4 wt % or more, and the neutron absorption rate at that time is about half the neutron absorption rate of the burnable poison-added fuel rod Rod 1. That is, to increase the neutron absorption effect of the burnable poison, loading of the fuel rod onto the outermost periphery is effective and the effectiveness becomes noticeable with the increase in the fissile plutonium enrichment. Further, although the neutron absorption rate around the water rod WR is about half of that of the outermost periphery, the neutron absorption rate is constant at the fissile plutonium enrichment of 4 wt % or more. This position is superior to other positions other than the outermost periphery, that is, the position where the burnable poison-added fuel rod Rod 2 and the burnable poison-added fuel rod Rod 3 are disposed.

Next, the present inventors and the like have paid attention to the controllability of a reactor loaded with a MOX fuel. The controllability of the reactor described here refers to, when design of continuity of energy generation during a predetermined operation period at the time of operation is made, operating the reactor with a margin on design at the time of operation in consideration of an error of the design. If there is no such margin, the operation cannot be continued if the design has an error. Further, control of the reactor becomes difficult if the margin is too small. To maximize the margin throughout the operation period, the maximum margin can be obtained throughout the period if surplus reactivity (excess reactivity) at the time of operation is nearly constant from the beginning to the end of the operation. Note that the economic efficiency is improved when the margin is designed to become almost 0 at the end of the operation. To achieve such design, the fuel to which the burnable poison is added and the fuel of the burned added burnable poison are mixed and used in the existing reactor. The fuel that is decreased in the infinite multiplication factor by burnup and the fuel that is increased in the infinite multiplication factor by the burnable poison are arranged in the reactor, whereby the excess reactivity is flattened. To flatten the excess reactivity, a straight line in which the infinite multiplication factor is increased with the burnup is required to offset a straight line in which the infinite multiplication factor is decreased with the burnup. However, if the increasing straight line becomes nonlinear, the excess reactivity becomes non flat and the margin on design becomes small.

Figure 10:
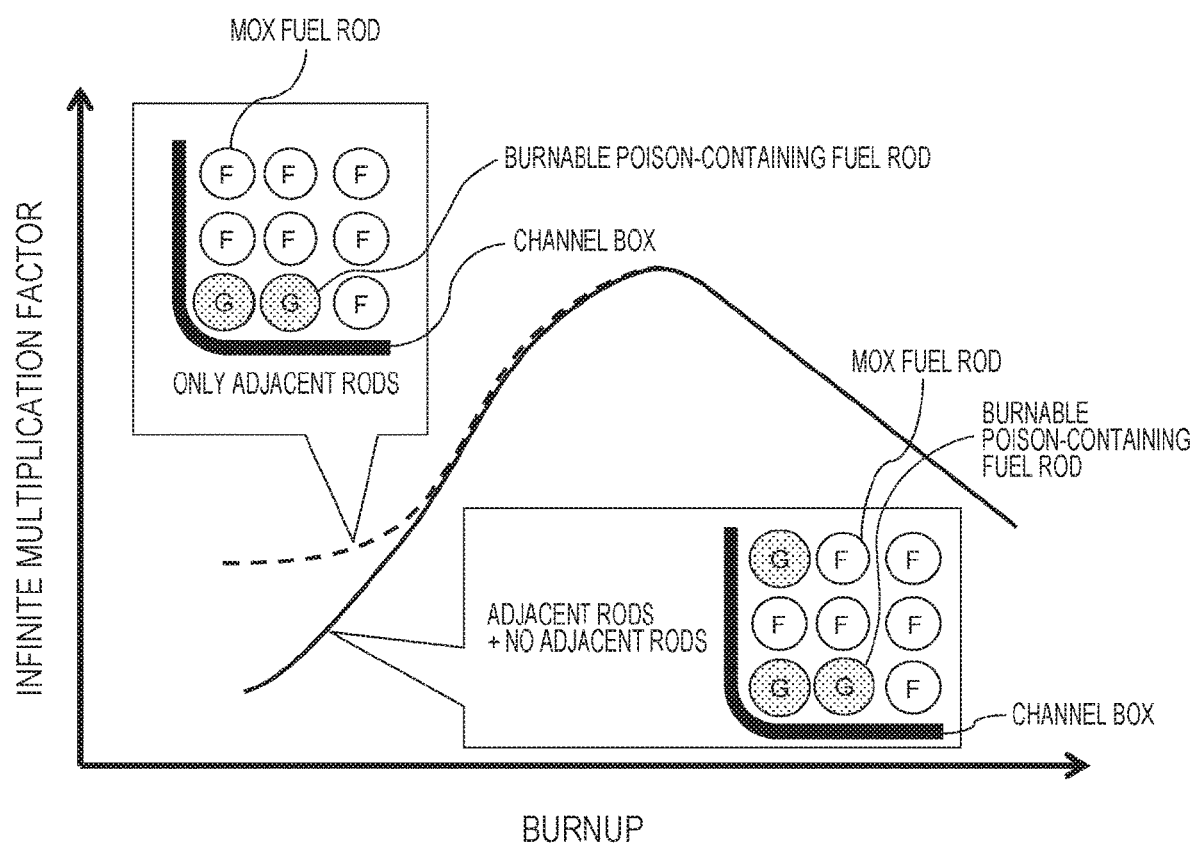
FIG. 10 is a diagram illustrating a linearization effect of an infinite multiplication factor obtained by a fuel assembly according to an embodiment of the present invention.

FIG. 10 illustrates a linearization effect of the infinite multiplication factor obtained by a fuel assembly. As illustrated in FIG. 10, in the case where the fuel rods to which burnable poison is added are vertically and/or horizontally adjacent to each other in the horizontal section of the fuel assembly, the increasing straight line becomes nonlinear. This nonlinearity is due to suppression of neutron absorption at the initial stage of burnup. To make the nonlinear line be a straight line, a configuration to increase the neutron absorption effect at the initial stage of burnup and to make the neutron absorption effect zero in a middle stage of burnup may just be added. In the case where the burnable poison is not arranged at adjacent positions of the fuel rods to which the burnable poison is added on the outermost periphery or at the position adjacent to the water rod of the fuel assembly, the neutron absorption effect is large, and thus the neutron absorption effect is large at the initial stage of burnup. Furthermore, in the case where the concentrations of the burnable poison are similar between the adjacent burnable poison-added fuel rod and a nonadjacent burnable poison-added fuel rod, the burnable poison in the latter rod is burned up in an about half period of that in the former rod. That is, from the viewpoint of the adjacent burnable poison-added fuel rod, the neutron absorption effect of the nonadjacent burnable poison-added fuel rod becomes almost zero in the middle of burnup. However, if the number of the nonadjacent burnable poison-added fuel rods becomes too large, the neutron absorption effect at the initial stage becomes large, and the straight line in which the infinite multiplication factor is increased is not obtained. If the nonadjacent burnable poison-added fuel rod is added for this purpose, it is counterproductive unless the number of the nonadjacent burnable poison-added fuel rods is smaller than the number of the adjacent burnable poison-added fuel rods.

Embodiments of the present invention reflecting the above examination result will be described below with reference to the drawings.

Note that, hereinafter, an advanced boiling water reactor (ABWR) will be described as an example. However, an embodiment is not limited to the example. For example, the present invention can be similarly applied to other nuclear reactors such as an ordinary boiling water reactor (BWR) provided with recirculation pumps, and which circulates a coolant (also functioning as a moderator for neutrons) to the outside of a reactor pressure vessel and causes the coolant to flow back to a downcomer in the reactor pressure vessel, thereby to circulate the coolant, or an economic simplified boiling water reactor (ESBWR) that eliminates the recycling pumps in BWR and internal pumps in ABWR, by use of a natural circulation system of cooling water by chimney.

First Embodiment

Figure 1:
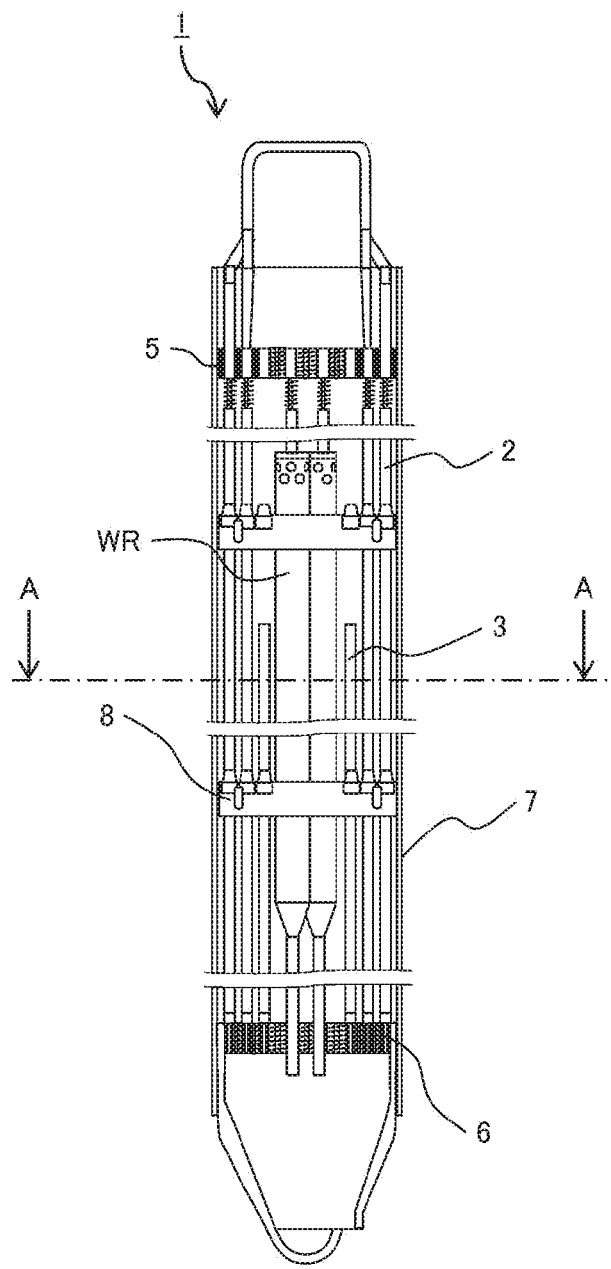
FIG. 1 is an overall schematic configuration view of a fuel assembly of a first embodiment according to an embodiment of the present invention.
Figure 2:
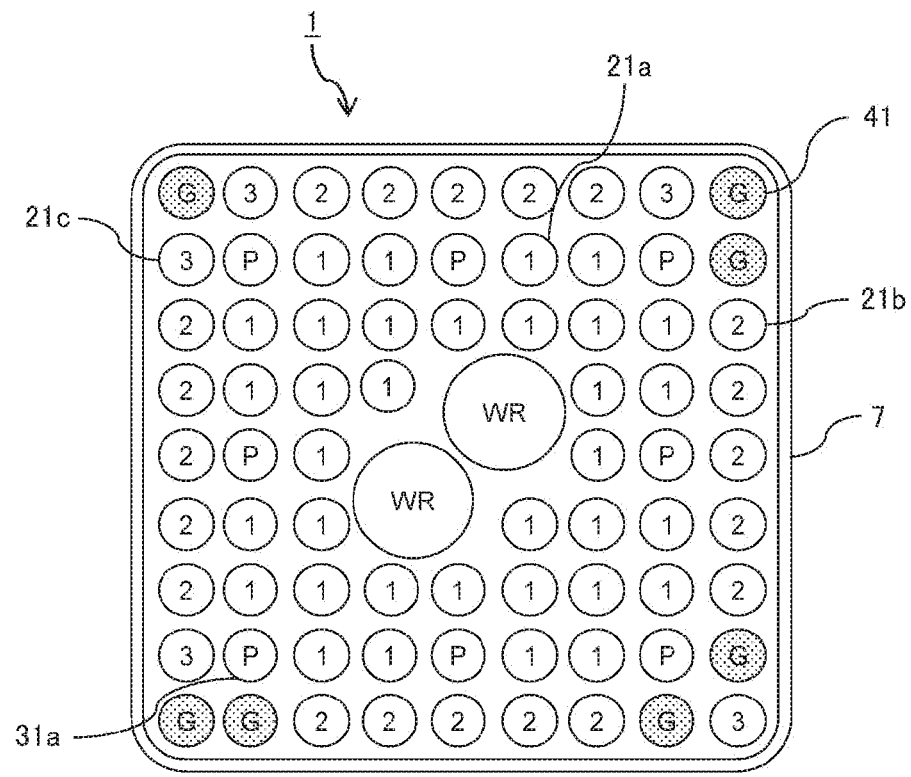
FIG. 2 is a sectional view taken along line AA (horizontal sectional view) of the fuel assembly illustrated in FIG. 1, and is a view illustrating the enrichment of each fuel rod and addition of burnable poison.
Figure 2:
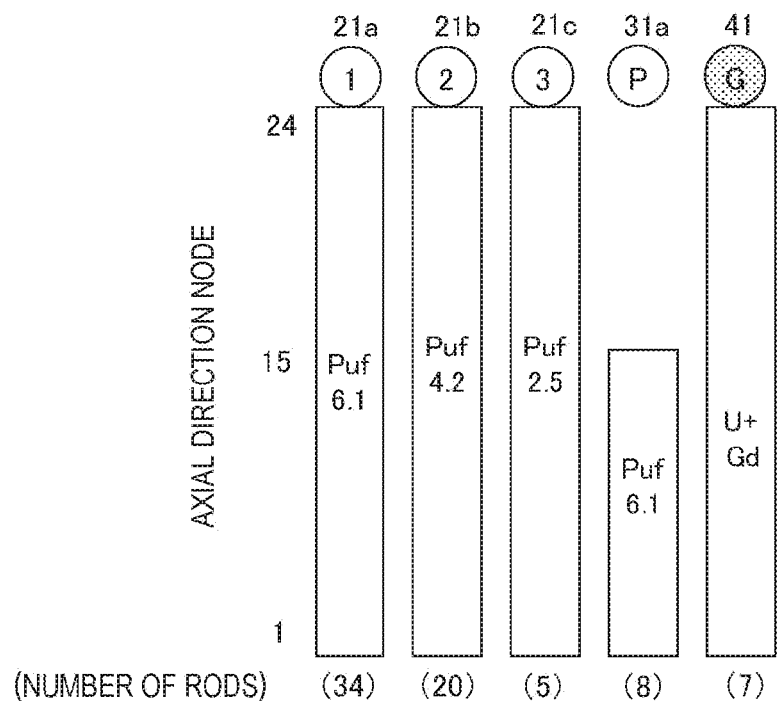
Figure 3:
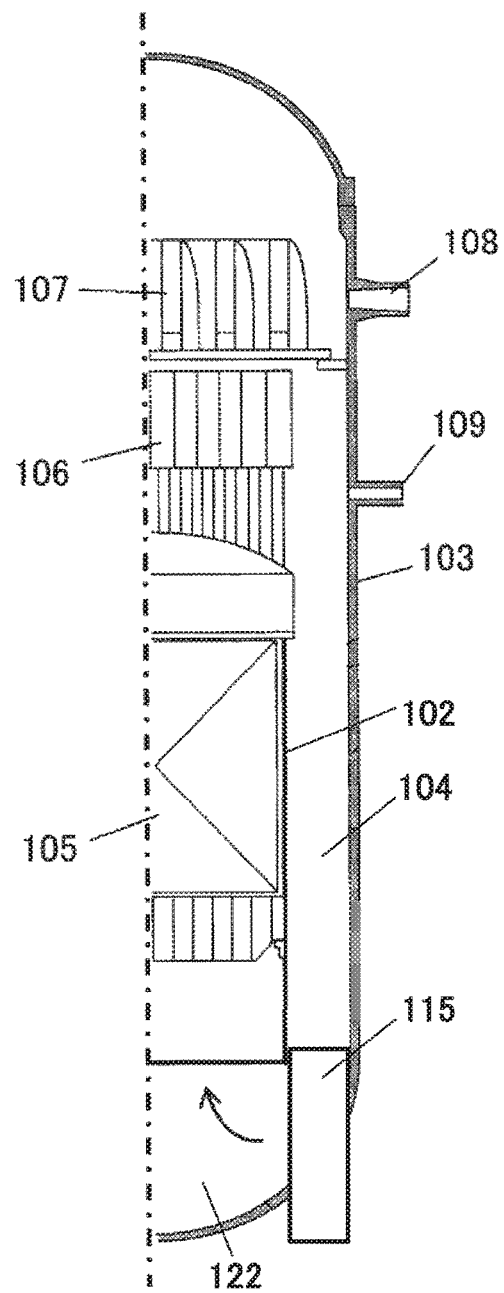
FIG. 3 is a schematic configuration view of an advanced boiling water reactor provided with a reactor loaded with the fuel assembly illustrated in FIG. 2.

FIG. 1 is an overall schematic configuration view of a fuel assembly of a first embodiment according to an embodiment of the present invention, FIG. 2 is a sectional view taken along line AA (horizontal sectional view) of the fuel assembly illustrated in FIG. 1, and is a view illustrating the enrichment of each fuel rod and addition of burnable poison, and FIG. 3 is a schematic configuration view of an advanced boiling water reactor provided with a reactor loaded with the fuel assembly illustrated in FIG. 2.

As illustrated in FIG. 3, in the advanced boiling water reactor (ABWR), a cylindrical reactor shroud 102 is provided in a reactor pressure vessel (reactor vessel) 103, and a reactor 105 loaded with a plurality of fuel assemblies (not illustrated) is disposed in the reactor shroud 102. Further, a steam-water separator 106 extending upward of the reactor 105 and a steam dryer 107 arranged above the steam-water separator 106 are provided in the reactor pressure vessel (hereinafter referred to as RPV) 103. An annular downcomer 104 is formed between the RPV 103 and the reactor shroud 102. An internal pump 115 is disposed inside the downcomer 104.

Cooling water discharged from the internal pumps 115 is supplied to the reactor 105 via a lower plenum 122. When passing through the reactor 105, the cooling water is heated and becomes gas-liquid two-phase flow containing water and steam. The steam-water separator 106 separates the gas-liquid two-phase flow into steam and water. Moisture is further removed from the separated steam by the steam dryer 107 and the steam is led to a main steam pipe 108. The steam from which moisture has been removed is led to a steam turbine (not illustrated) to rotate the steam turbine. A generator connected to the steam turbine is rotated to generate power. The steam discharged from the steam turbine is condensed in a condenser (not illustrated) to become water. This condensed water is supplied as cooling water into the RPV 103 through a water supply pipe 109. The water separated by the steam-water separator 106 and the steam dryer 107 falls and reaches the downcomer 104 as cooling water.

Although not illustrated in FIG. 3, a control rod guide pipe is provided in the lower plenum 122 of the RPV 103. The control rod guide pipe enables a plurality of control rods CR having a cross shape in cross section to be inserted into the reactor 105 to control a nuclear reaction of the fuel assembly. A control rod drive mechanism is provided in a control rod drive mechanism housing installed below a bottom portion of the RPV 103. The control rods are connected to the control rod drive mechanism.

FIG. 1 illustrates an overall schematic configuration view of the fuel assembly 1. The fuel assembly 1 of the present embodiment includes a plurality of fuel rods 2, partial length fuel rods 3, an upper tie plate 5, a lower tie plate 6, a plurality of fuel spacers 8, a plurality of water rods WR, and a channel box 7. The fuel rods 2 (so-called full length fuel rods) and the partial length fuel rods 3 have a plurality of fuel pellets (not illustrated) filled in a sealed cladding tube (not illustrated). The lower tie plate 6 supports lower end portions of the fuel rods 2 and the partial length fuel rod 3, and the upper tie plate 5 holds upper end portions of the fuel rods 2. Lower end portions of the water rods WR are supported by the lower tie plate 6, and upper end portions of the water rods WR are held by the upper tie plate 5. The plurality of fuel spacers 8 is arranged at predetermined intervals in an axial direction of the fuel assembly 1, and holds the fuel rods 2 and the water rods WR to form flow paths in which the cooling water flows between the fuel rods 2 (including the partial length fuel rod 3) and between the fuel rod 2 and the water rod WR. The channel box 7, which is a square tube having a square shape in cross section, is attached to the upper tie plate 5 and extends downward. The fuel rods 2 bundled by the fuel spacers 8 are arranged in the channel box 7. A handle is fastened to an upper end portion of the upper tie plate 5, and when the handle is lifted up, the entire fuel assembly 1 can be pulled up.

FIG. 2 is a sectional view taken along line AA (horizontal sectional view) of the fuel assembly 1 illustrated in FIG. 1, and is a view illustrating the enrichment of each fuel rod and addition of burnable poison. As illustrated in the upper view of FIG. 2, fuel rods 21a to 21c, a partial length fuel rod 31a, a water rod WR, and a gadolinium-containing fuel rod 41 that is a fuel rod containing gadolinium that is burnable poison are arranged in a nine-row by nine-column square lattice formed in the channel box 7 in the horizontal section of the fuel assembly 1. Two water rods WR having a cross-sectional area occupying a region where four fuel rods 2 are arrangeable are arranged in a central portion of the horizontal section (cross section) of the fuel assembly 1. The water rod WR is a large-diameter water rod having a cross-sectional area occupying a region where at least two fuel rods 2 are arrangeable. The length of a region where a fuel pellet containing fissile uranium is loaded in the fuel rod 2 in the present embodiment, that is, the effective fuel length of the present embodiment is 3.7 m.

Further, when the fuel assembly 1 is loaded in the reactor 105 of the advanced boiling water reactor (ABWR), the fuel assembly 1 is arranged to have one corner face the control rod CR having a cross shape in cross section inserted in the reactor 105. The channel box 7 is attached to the upper tie plate 5 by a channel fastener (not illustrated). The channel fastener functions to hold a gap of a width necessary between the fuel assemblies 1 so that the control rod CR can be inserted into between the fuel assemblies 1 when the fuel assemblies 1 are loaded in the reactor 105. For this purpose, the channel fastener is attached to the upper tie plate 6 to be located at a corner facing the control rod CR. The corner portion of the fuel assembly 1, the corner portion facing the control rod CR, is in other words the corner portion to which the channel fastener is attached. Each fuel pellet filled in each fuel rod 2 is manufactured using uranium dioxide and plutonium oxide which are nuclear fuel materials, and contains uranium −235 and plutonium −239 and 241 that are fissile materials, and the like.

As illustrated in the upper and lower views of FIG. 2, the fissile plutonium enrichment of the fuel rod 21a is 6.1 wt %, and thirty four fuel rods 21a are accommodated at lattice positions in the horizontal section of the fuel assembly 1. Further, the fissile plutonium enrichment of the fuel rod 21b is 4.2 wt %, and twenty fuel rods 21b are accommodated at lattice positions in the horizontal section of the fuel assembly 1. The fissile plutonium enrichment of the fuel rod 21c is 2.5 wt %, and five fuel rods 21c are accommodated at lattice positions in the horizontal section of the fuel assembly 1. Further, the fissile plutonium enrichment of the partial length fuel rod 31a is 6.1 wt %, and eight partial length fuel rods 31a are accommodated at lattice positions in the horizontal section of the fuel assembly 1. The gadolinium-containing fuel rod 41 does not contain plutonium but is constituted only by a uranium fuel, the enrichment of uranium is 0.2 wt % and the concentration of gadolinium (Gd), which is burnable poison, is 10 wt %. Seven gadolinium-containing fuel rods 41 are accommodated at lattice positions within the horizontal section of the fuel assembly 1. Note that the concentration of gadolinium (Gd) is not limited to 10 wt % and may be appropriately set to a desired value within a range of several wt % to 10 wt %, for example, and the enrichment of uranium is also not limited to 0.2 wt %. The fissile plutonium enrichment of a horizontal section average of the fuel assembly 1 is 4.8 wt %.

In the horizontal section of the fuel assembly 1, the number of the gadolinium-containing fuel rods 41, which are burnable poison-containing fuel rods arranged on the outermost periphery, is N1, and the number of the gadolinium-containing fuel rods, which are burnable poison-containing fuel rods arranged adjacent to the water rod WR, is N2 (N2 is a positive integer including zero). In this case, in the upper view of FIG. 2, N1 is seven and N2 is zero, and a relationship of N1>N2 is satisfied.

Further, the number of gadolinium-containing fuel rods, which are burnable poison-containing fuel rods arranged on the outermost periphery without being vertically and/or horizontally adjacent to each other, is W0, the number of gadolinium-containing fuel rods, which are burnable poison-containing fuel rods vertically and/or horizontally adjacent to each other and arranged on the outermost periphery, and adjacent to only one burnable poison-containing fuel rod, is W1, and the number of gadolinium-containing fuel rods, which are burnable poison-containing fuel rods vertically and/or horizontally adjacent to each other and arranged on the outermost periphery, and adjacent to two burnable poison-containing fuel rods, is W2 (W2 is a positive integer including zero). In this case, in the upper view of FIG. 2, W0 is three, W1 is four, W2 is zero, and a relationship of W2<N2+W0<W1 is satisfied. By arranging the gadolinium-containing fuel rods 41 as illustrated in the upper view of FIG. 2, change of an infinite multiplication factor of the fuel can be linearized, as illustrated in FIG. 10, and the average fissile plutonium enrichment of the MOX fuel can be increased because the fissile plutonium enrichment of the horizontal section average of the fuel assembly 1 is 4.8 wt %.

As described above, according to the present embodiment, the change of the infinite multiplication factor of the fuel can be linearized and excess reactivity can be flattened while increasing the average fissile plutonium enrichment of the MOX fuel.

Second Embodiment

Figure 4:
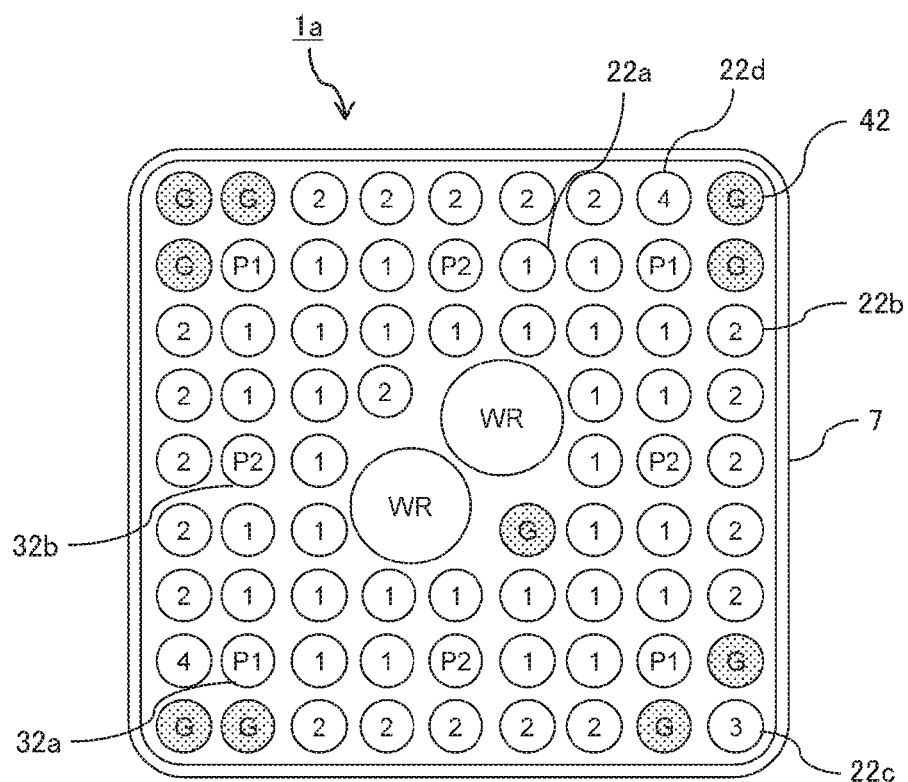
FIG. 4 is a horizontal sectional view of a fuel assembly of a second embodiment according to another embodiment of the present invention, and is a view illustrating the enrichment of each fuel rod and addition of burnable poison.
Figure 4:
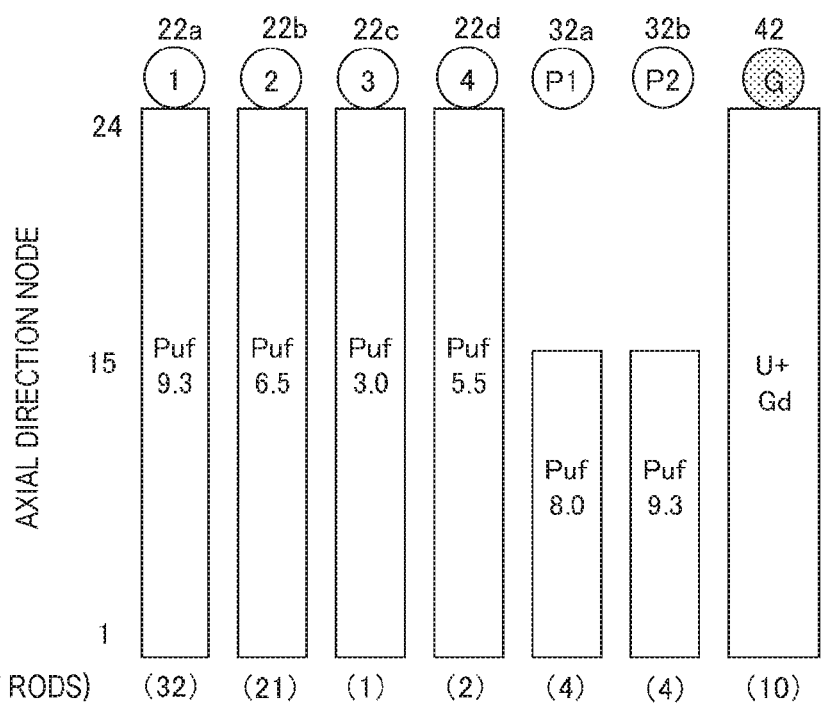

FIG. 4 is a horizontal sectional view of a fuel assembly of a second embodiment according to another embodiment of the present invention, and is a view illustrating the enrichment of each fuel rod and addition of burnable poison. In the present embodiment, the fissile plutonium enrichment in fuel rods and arrangement positions of gadolinium-containing fuel rods, which are burnable poison-containing fuels, are different from those in the first embodiment. The other points are similar to those of the first embodiment, and hereinafter description overlapping with the first embodiment will be omitted.

As illustrated in the upper view of FIG. 4, fuel rods 22a to 22d, a partial length fuel rod 32a, a partial length fuel rod 32b, a water rod WR, and a gadolinium-containing fuel rod 42 that is a fuel rod containing gadolinium that is burnable poison are arranged in a nine-row by nine-column square lattice formed in a channel box 7 in a horizontal section of a fuel assembly 1a in the fuel assembly 1a of the present embodiment. Two water rods WR having a cross-sectional area occupying a region where four fuel rods are arrangeable are arranged in a central portion of the horizontal section (cross section) of the fuel assembly 1a. The water rod WR is a large-diameter water rod having a cross-sectional area occupying a region where at least two fuel rods are arrangeable. The length of a region where a fuel pellet containing fissile uranium is loaded in the fuel rod in the present embodiment, that is, the effective fuel length of the present embodiment is 3.7 m.

As illustrated in the upper and lower views of FIG. 4, the fissile plutonium enrichment of the fuel rod 22a is 9.3 wt %, and thirty two fuel rods 22a are accommodated at lattice positions in the horizontal section of the fuel assembly 1a. Further, the fissile plutonium enrichment of the fuel rod 22b is 6.5 wt %, and twenty one fuel rods 22b are accommodated at lattice positions in the horizontal section of the fuel assembly 1a. The fissile plutonium enrichment of the fuel rod 22c is 3.0 wt %, and one fuel rod 22c is accommodated at a lattice position in the horizontal section of the fuel assembly 1a. The fissile plutonium enrichment of the fuel rod 22d is 5.5 wt %, and two fuel rods 22d are accommodated at lattice positions in the horizontal section of the fuel assembly 1a. Further, the fissile plutonium enrichment of the partial length fuel rod 32a is 8.0 wt %, and four partial length fuel rods 32a are accommodated at lattice positions in the horizontal section of the fuel assembly 1a. The fissile plutonium enrichment of the partial length fuel rod 32b is 9.3 wt %, and four partial length fuel rods 32b are accommodated at lattice positions in the horizontal section of the fuel assembly 1a. The gadolinium-containing fuel rod 42 does not contain plutonium but is constituted only by a uranium fuel, the enrichment of uranium is 0.2 wt % and the concentration of gadolinium (Gd), which is burnable poison, is 10 wt %. Ten gadolinium-containing fuel rods 42 are accommodated at lattice positions within the horizontal section of the fuel assembly 1a. Note that the concentration of gadolinium (Gd) is not limited to 10 wt % and may be appropriately set to a desired value within a range of several wt % to 10 wt %, for example, and the enrichment of uranium is also not limited to 0.2 wt %. The fissile plutonium enrichment of a horizontal section average of the fuel assembly 1a is 6.8 wt %.

As illustrated in the upper view in FIG. 4, in the horizontal section of the fuel assembly 1a, the number (N1) of the gadolinium-containing fuel rods 42, which are burnable poison-containing fuel rods arranged on the outermost periphery, is nine, and the number (N2) of the gadolinium-containing fuel rods 42, which are burnable poison-containing fuel rods arranged adjacent to the water rod WR, is one, and N1>N2 is satisfied. Further, the number (W0) of gadolinium-containing fuel rods, which are burnable poison-containing fuel rods arranged on the outermost periphery without being vertically and/or horizontally adjacent to each other, is two, the number (W1) of gadolinium-containing fuel rods, which are burnable poison-containing fuel rods vertically and/or horizontally adjacent to each other and arranged on the outermost periphery, and adjacent to only one burnable poison-containing fuel rod, is six, and the number (W2) of gadolinium-containing fuel rods, which are burnable poison-containing fuel rods vertically and/or horizontally adjacent to each other and arranged on the outermost periphery, and adjacent to two burnable poison-containing fuel rods, is one, and W2<N2+W0<W1 is satisfied. By arranging the gadolinium-containing fuel rods 42 as illustrated in the upper view of FIG. 4, change of an infinite multiplication factor of the fuel can be linearized, as illustrated in FIG. 10, and average fissile plutonium enrichment of a MOX fuel can be increased because the fissile plutonium enrichment of the horizontal section average of the fuel assembly 1a is 6.8 wt %.

As described above, according to the present embodiment, the average fissile plutonium enrichment can be further improved as compared with the first embodiment in addition to the effect of the first embodiment.

Third Embodiment

Figure 5:
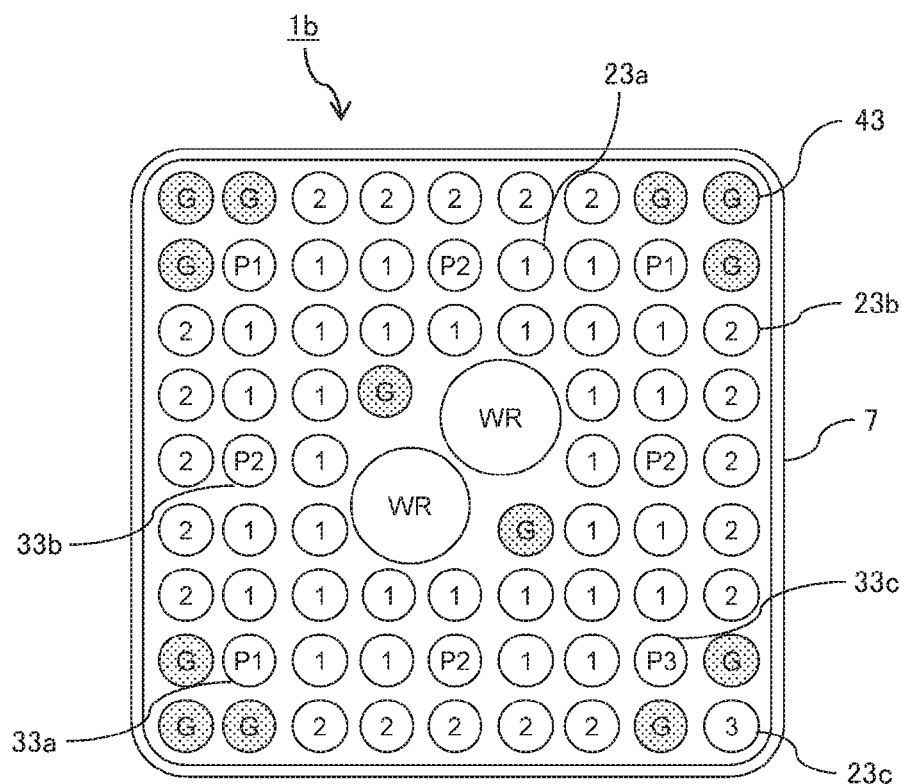
FIG. 5 is a horizontal sectional view of a fuel assembly of a third embodiment according to another embodiment of the present invention, and is a view illustrating the enrichment of each fuel rod and addition of burnable poison.
Figure 5:
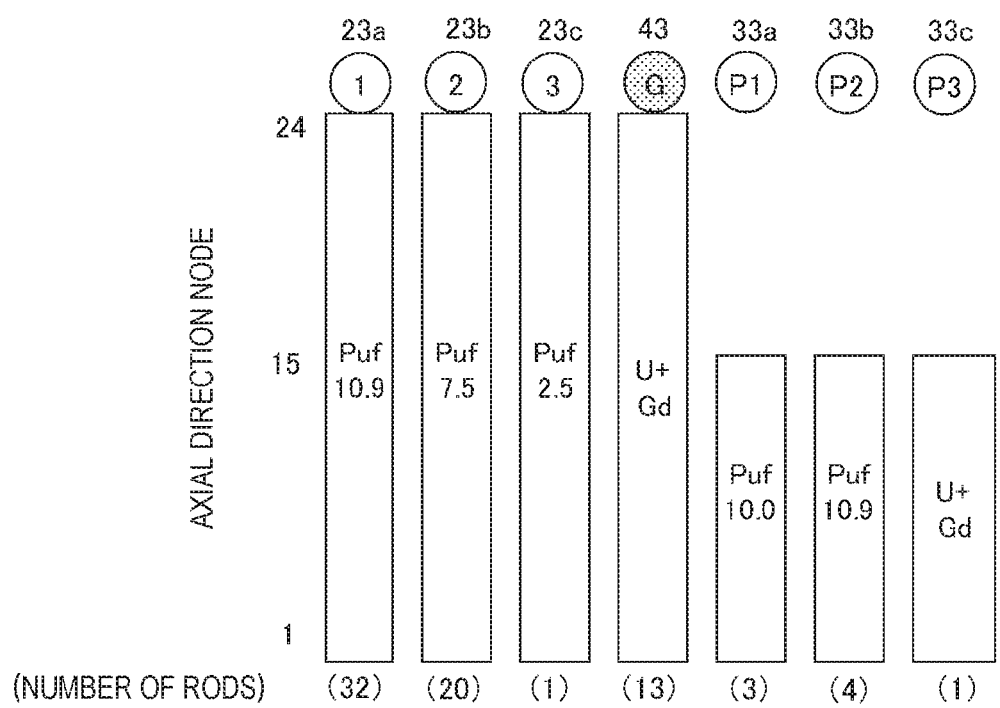

FIG. 5 is a horizontal sectional view of a fuel assembly of a third embodiment according to another embodiment of the present invention, and is a view illustrating the enrichment of each fuel rod and addition of burnable poison. In the present embodiment, the fissile plutonium enrichment in fuel rods and arrangement positions of gadolinium-containing fuel rods, which are burnable poison-containing fuels, are different from those in the first embodiment. The other points are similar to those of the first embodiment, and hereinafter description overlapping with the first embodiment will be omitted.

As illustrated in the upper view of FIG. 5, fuel rods 23a to 23c, partial length fuel rods 33a to 33c, a water rod WR, and a gadolinium-containing fuel rod 43 that is a fuel rod containing gadolinium that is burnable poison are arranged in a nine-row by nine-column square lattice formed in a channel box 7 in a horizontal section of a fuel assembly 1b in the fuel assembly 1b of the present embodiment. Two water rods WR having a cross-sectional area occupying a region where four fuel rods are arrangeable are arranged in a central portion of the horizontal section (cross section) of the fuel assembly 1b. The water rod WR is a large-diameter water rod having a cross-sectional area occupying a region where at least two fuel rods are arrangeable. The length of a region where a fuel pellet containing fissile uranium is loaded in the fuel rod in the present embodiment, that is, the effective fuel length of the present embodiment is 3.7 m.

As illustrated in the upper and lower views of FIG. 5, the fissile plutonium enrichment of the fuel rod 23a is 10.9 wt %, and thirty two fuel rods 23a are accommodated at lattice positions in the horizontal section of the fuel assembly 1b. Further, the fissile plutonium enrichment of the fuel rod 23b is 7.5 wt %, and twenty fuel rods 23b are accommodated at lattice positions in the horizontal section of the fuel assembly 1b. The fissile plutonium enrichment of the fuel rod 23c is 2.5 wt %, and one fuel rod 23c is accommodated at a lattice position in the horizontal section of the fuel assembly 1b. The fissile plutonium enrichment of the partial length fuel rod 33a is 10.0 wt %, and three partial length fuel rods 33a are accommodated at lattice positions in the horizontal section of the fuel assembly 1b. Further, the fissile plutonium enrichment of the partial length fuel rod 33b is 10.9 wt %, and four partial length fuel rods 33b are accommodated at lattice positions in the horizontal section of the fuel assembly 1b. The partial length fuel rod 33c is a gadolinium-containing fuel rod, the enrichment of uranium is 0.2 wt %, the concentration of gadolinium is 10 wt %, and one partial length fuel rod 33c is accommodated at a lattice position in the horizontal section of the fuel assembly 1b. The gadolinium-containing fuel rod 43 does not contain plutonium but is constituted only by a uranium fuel, the enrichment of uranium is 0.2 wt % and the concentration of gadolinium (Gd), which is burnable poison, is 10 wt %. Thirteen gadolinium-containing fuel rods 43 are accommodated at lattice positions within the horizontal section of the fuel assembly 1b. Note that the concentration of gadolinium (Gd) is not limited to 10 wt % and may be appropriately set to a desired value within a range of several wt % to 10 wt %, for example, and the enrichment of uranium is also not limited to 0.2 wt %. The fissile plutonium enrichment of a horizontal section average of the fuel assembly 1b is 7.8 wt %.

As illustrated in the upper view of FIG. 5, in the horizontal section of the fuel assembly 1b, the number (N1) of the gadolinium-containing fuel rods 43, which are burnable poison-containing fuel rods arranged on the outermost periphery, is eleven, and the number (N2) of the gadolinium-containing fuel rods 43, which are burnable poison-containing fuel rods arranged adjacent to the water rod WR, is two, and N1>N2 is satisfied. Further, the number (W0) of gadolinium-containing fuel rods, which are burnable poison-containing fuel rods arranged on the outermost periphery without being vertically and/or horizontally adjacent to each other, is two, the number (W1) of gadolinium-containing fuel rods, which are burnable poison-containing fuel rods vertically and/or horizontally adjacent to each other and arranged on the outermost periphery, and adjacent to only one burnable poison-containing fuel rod, is six, and the number (W2) of gadolinium-containing fuel rods, which are burnable poison-containing fuel rods vertically and/or horizontally adjacent to each other and arranged on the outermost periphery, and adjacent to two burnable poison-containing fuel rods, is three, and W2<N2+W0<W1 is satisfied. By arranging the gadolinium-containing fuel rods 42 as illustrated in the upper view of FIG. 5, change of an infinite multiplication factor of the fuel can be linearized, as illustrated in FIG. 10, and average fissile plutonium enrichment of a MOX fuel can be increased because the fissile plutonium enrichment of the horizontal section average of the fuel assembly 1b is 7.8 wt %.

According to the present embodiment, the average fissile plutonium enrichment can be further improved as compared with the first and second embodiments in addition to the effect of the first embodiment.

Fourth Embodiment

Figure 6:
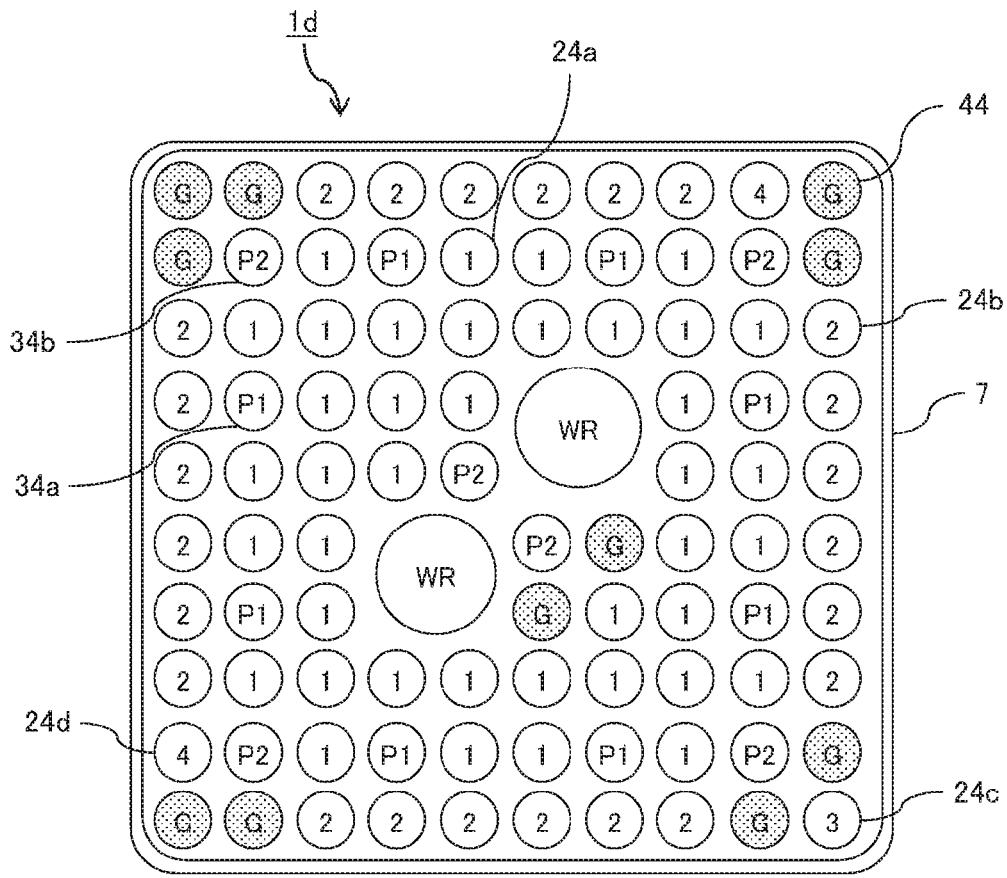
FIG. 6 is a horizontal sectional view of a fuel assembly of a fourth embodiment according to another embodiment of the present invention, and is a view illustrating the enrichment of each fuel rod and addition of burnable poison.
Figure 6:
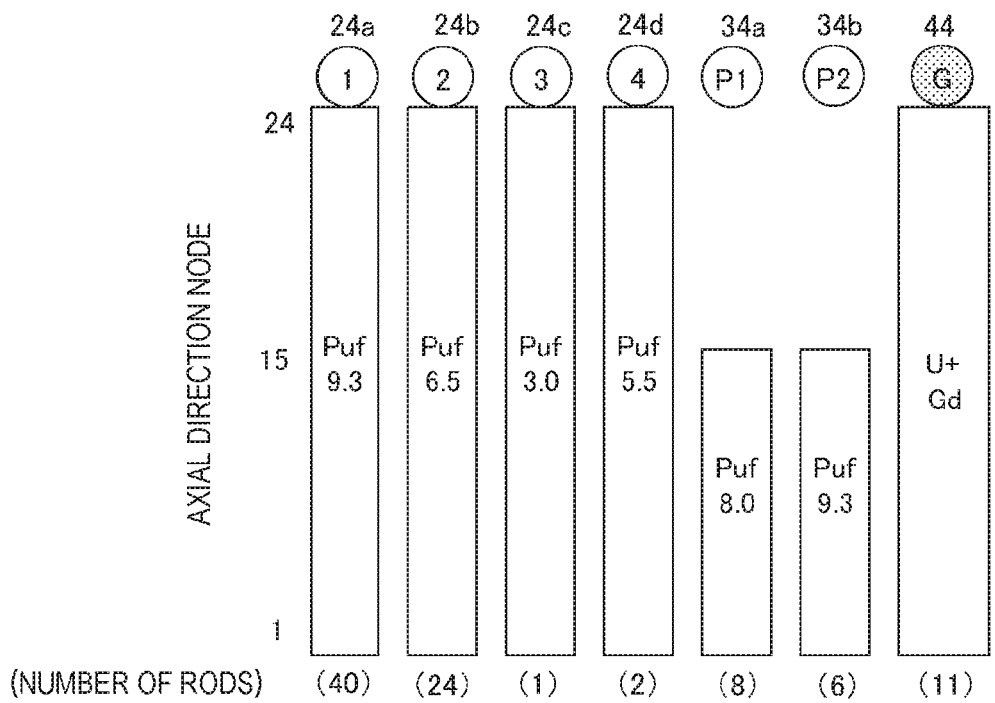

FIG. 6 is a horizontal sectional view of a fuel assembly of a fourth embodiment according to another embodiment of the present invention, and is a view illustrating the enrichment of each fuel rod and addition of burnable poison. The present embodiment is different from the second embodiment in arranging the fuel rods in a ten by ten array in a square lattice manner.

As illustrated in the upper view of FIG. 6, fuel rods 24a to 24d, a partial length fuel rod 34a, a partial length fuel rod 34b, a water rod WR, and a gadolinium-containing fuel rod 44 that is a fuel rod containing gadolinium that is burnable poison are arranged in a ten-row by ten-column square lattice formed in a channel box 7 in a horizontal section of a fuel assembly 1d in the fuel assembly 1d of the present embodiment. Two water rods WR having a cross-sectional area occupying a region where four fuel rods are arrangeable are arranged in a central portion of the horizontal section (cross section) of the fuel assembly 1d. The water rod WR is a large-diameter water rod having a cross-sectional area occupying a region where at least two fuel rods are arrangeable. The length of a region where a fuel pellet containing fissile uranium is loaded in the fuel rod in the present embodiment, that is, the effective fuel length of the present embodiment is 3.7 m.

As illustrated in the upper and lower views of FIG. 6, the fissile plutonium enrichment of the fuel rod 24a is 9.3 wt %, and forty fuel rods 24a are accommodated at lattice positions in the horizontal section of the fuel assembly 1d. Further, the fissile plutonium enrichment of the fuel rod 24b is 6.5 wt %, and twenty four fuel rods 24b are accommodated at lattice positions in the horizontal section of the fuel assembly 1d. The fissile plutonium enrichment of the fuel rod 24c is 3.0 wt %, and one fuel rod 24c is accommodated at a lattice position in the horizontal section of the fuel assembly 1d. The fissile plutonium enrichment of the fuel rod 24d is 5.5 wt %, and two fuel rods 24d are accommodated at lattice positions in the horizontal section of the fuel assembly 1d. Further, the fissile plutonium enrichment of the partial length fuel rod 34a is 8.0 wt %, and eight partial length fuel rods 34a are accommodated at lattice positions in the horizontal section of the fuel assembly 1d. The fissile plutonium enrichment of the partial length fuel rod 34b is 9.3 wt %, and six partial length fuel rods 34b are accommodated at lattice positions in the horizontal section of the fuel assembly 1d. The gadolinium-containing fuel rod 44 does not contain plutonium but is constituted only by a uranium fuel, the enrichment of uranium is 0.2 wt % and the concentration of gadolinium (Gd), which is burnable poison, is 10 wt %. Eleven gadolinium-containing fuel rods 44 are accommodated at lattice positions within the horizontal section of the fuel assembly 1d. Note that the concentration of gadolinium (Gd) is not limited to 10 wt % and may be appropriately set to a desired value within a range of several wt % to 10 wt %, for example, and the enrichment of uranium is also not limited to 0.2 wt %. The fissile plutonium enrichment of a horizontal section average of the fuel assembly 1d is 7.2 wt %.

As illustrated in the upper view of FIG. 6, in the horizontal section of the fuel assembly 1d, the number (N1) of the gadolinium-containing fuel rods 44, which are burnable poison-containing fuel rods arranged on the outermost periphery, is nine, and the number (N2) of the gadolinium-containing fuel rods 44, which are burnable poison-containing fuel rods arranged adjacent to the water rod WR, is two, and N1>N2 is satisfied. Further, the number (W0) of gadolinium-containing fuel rods, which are burnable poison-containing fuel rods arranged on the outermost periphery without being vertically and/or horizontally adjacent to each other, is two, the number (W1) of gadolinium-containing fuel rods, which are burnable poison-containing fuel rods vertically and/or horizontally adjacent to each other and arranged on the outermost periphery, and adjacent to only one burnable poison-containing fuel rod, is six, and the number (W2) of gadolinium-containing fuel rods, which are burnable poison-containing fuel rods vertically and/or horizontally adjacent to each other and arranged on the outermost periphery, and adjacent to two burnable poison-containing fuel rods, is one, and $W2<N2+W0<W1$ is satisfied. By arranging the gadolinium-containing fuel rods 42 as illustrated in the upper view of FIG. 6, change of an infinite multiplication factor of the fuel can be linearized, as illustrated in FIG. 10, and average fissile plutonium enrichment of a MOX fuel can be increased because the fissile plutonium enrichment of the horizontal section average of the fuel assembly 1d is 7.2 wt %.

As described above, according to the present embodiment, the average fissile plutonium enrichment can be further improved as compared with the second embodiment in addition to the effect of the second embodiment. Further, an average output per fuel rod is decreased as the number of fuel rods in the fuel assembly 1d is increased, and thus heat removal becomes easy and thermal margin can be improved as compared with the second embodiment.

Note that the present invention is not limited to the above-described embodiments and includes various modifications. For example, the above embodiments have been described in detail for easy understanding of the present invention, and the present invention is not necessarily limited to one including all the described configurations. Further, a part of the configuration of a certain embodiment can be replaced with the configuration of another embodiment. Further, the configuration of another embodiment can be added to the configuration of a certain embodiment. Further, the configuration of another embodiment can be added to/deleted from/replaced with a part of the configurations of each embodiment.

REFERENCE SIGNS LIST 1, 1a, 1b, 1d fuel assembly
2, 21a to 21c, 22a to 22d, 23a to 23c, 24a to 24d fuel rod
3, 31a, 32a, 32b, 33a, 33b, 34a, 34b partial length fuel rod
4, 41, 42, 43, 44 gadolinium-containing fuel rod
5 upper tie plate
6 lower tie plate
7 channel box
8 spacer
WR water rod
102 reactor shroud
103 reactor pressure vessel
104 downcomer
105 reactor
106 steam-water separator
107 steam dryer
108 main steam pipe
109 water supply pipe
115 internal pump
122 lower plenum

The invention claimed is:

1. A fuel assembly comprising: at least, a first fuel rod containing plutonium and not containing burnable poison; a plurality of second fuel rods containing uranium and burnable poison and not containing plutonium; a water rod; and a channel box having a rectangular shape in horizontal section and accommodating the first fuel rod, the plurality of second fuel rods, and the water rod in a bundle, wherein the plurality of second fuel rods is disposed on an outermost periphery and/or adjacent to the water rod, of a fuel rod array in the horizontal section, N2<N1 (N2 is a positive integer or zero) is satisfied where a number of the second fuel rods arranged on the outermost periphery is N1 and a number of the second fuel rods arranged adjacent to the water rod is N2, and of the second fuel rods arranged on the outermost periphery, W2<N2+WO<W1 (W2 is a positive integer) is satisfied where a number of the second fuel rods arranged without being vertically and/or horizontally adjacent to any of other of second fuel rods in the horizontal section is WO, a number of the second fuel rods arranged vertically and/or horizontally adjacent to only one second fuel rod in the horizontal section is W1, and a number of the second fuel rods arranged vertically and/or horizontally adjacent to two second fuel rods in the horizontal section is W2, and the second fuel rods arranged vertically and/or horizontally adjacent to the two second fuel rods in the horizontal section are arranged at a corner portion of the channel box.

2. The fuel assembly according to claim 1, wherein average fissile plutonium enrichment in the horizontal section is 4.0 wt % to 7.8 wt %.

3. The fuel assembly according to claim 2, wherein the burnable poison contained in the second fuel rod is gadolinium.

4. The fuel assembly according to claim 1, wherein the burnable poison contained in the second fuel rod is gadolinium.

5. The fuel assembly according to claim 3, wherein the fuel assembly includes a nine-row by nine-column fuel grid array, and the first fuel rod includes thirty four fuel rods with fissile plutonium enrichment of 6.1 wt %, twenty fuel rods with fissile plutonium enrichment of 4.2 wt %, five fuel rods with fissile plutonium enrichment of 2.5 wt %, and eight partial length fuel rods with fissile plutonium enrichment of 6.1 wt %.

6. The fuel assembly according to claim 3, wherein the fuel assembly includes a nine-row by nine-column fuel grid array, and the first fuel rod includes thirty two fuel rods with fissile plutonium enrichment of 9.3 wt %, twenty one fuel rods with fissile plutonium enrichment of 6.5 wt %, one fuel rod with fissile plutonium enrichment of 3.0 wt %, two fuel rods with fissile plutonium enrichment of 5.5 wt %, four partial length rods with fissile plutonium enrichment of 8.0 wt %, and four partial length fuel rods with fissile plutonium enrichment of 9.3 wt %.

7. The fuel assembly according to claim 3, wherein the fuel assembly includes a nine-row by nine-column fuel grid array, and the first fuel rod includes thirty two fuel rods with fissile plutonium enrichment of 10.9 wt %, twenty fuel rods with fissile plutonium enrichment of 7.5 wt %, one fuel rod with fissile plutonium enrichment of 2.5 wt %, three partial length fuel rods with fissile plutonium enrichment of 10.0 wt %, and four partial length fuel rods with fissile plutonium enrichment of 10.9 wt %.

8. The fuel assembly according to claim 3, wherein the fuel assembly includes a ten-row by ten-column fuel grid array, and the first fuel rod includes forty fuel rods with fissile plutonium enrichment of 9.3 wt %, twenty four fuel rods with fissile plutonium enrichment of 6.5 wt %, one fuel rod with fissile plutonium enrichment of 3.0 wt %, two fuel rods with fissile plutonium enrichment of 5.5 wt %, eight partial length rods with fissile plutonium enrichment of 8.0 wt %, and six partial length fuel rods with fissile plutonium enrichment of 9.3 wt %.

9. A reactor of a nuclear reactor loaded with a plurality of fuel assemblies, each of the fuel assemblies comprising:

at least, a first fuel rod containing plutonium and not containing burnable poison;

a plurality of second fuel rods containing uranium and burnable poison and not containing plutonium;

a water rod; and a channel box having a rectangular shape in horizontal section and accommodating the first fuel rod, the plurality of second fuel rods, and the water rod in a bundle, wherein the plurality of second fuel rods is disposed on an outermost periphery and/or adjacent to the water rod, of a fuel rod array in the horizontal section, N2<N1 (N2 is a positive integer or zero) is satisfied where a number of the second fuel rods arranged on the outermost periphery is N1 and a number of the second fuel rods arranged adjacent to the water rod is N2, and of the second fuel rods arranged on the outermost periphery, W2<N2+WO<W1 (W2 is a positive integer) is satisfied where a number of the second fuel rods arranged without being vertically and/or horizontally adjacent to any of other second fuel rods in the horizontal section is WO, a number of the second fuel rods arranged vertically and/or horizontally adjacent to only one second fuel rod in the horizontal section is Wi, and a number of the second fuel rods arranged vertically and/or horizontally adjacent to two second fuel rods in the horizontal section is W2, and the second fuel rods arranged vertically and/or horizontally adjacent to the two second fuel rods in the horizontal section are arranged at a corner portion of the channel box.

10. The reactor according to claim 9, wherein average fissile plutonium enrichment in the horizontal section is 4.0 wt % to 7.8 wt %.

11. The reactor according to claim 10, wherein the burnable poison contained in the second fuel rod is gadolinium.

12. The reactor according to claim 9, wherein the burnable poison contained in the second fuel rod is gadolinium.

* * * * *